United States Patent

Trevorrow et al.

[11] 3,867,121
[45] Feb. 18, 1975

[54] METHOD AND APPARATUS FOR THE MANUFACTURE OF THIN GLASS ON MOLTEN METAL

[75] Inventors: Thomas R. Trevorrow, Ford City; Kenneth R. Graff, Cabot, both of Pa.

[73] Assignee: PPG Industries, Inc., Pittsburgh, Pa.

[22] Filed: Mar. 6, 1973

[21] Appl. No.: 338,474

[52] U.S. Cl. ............... 65/65 A, 65/99 A, 65/182 R
[51] Int. Cl. .......................................... C03b 18/02
[58] Field of Search .............. 65/65 A, 99 A, 182 R

[56] References Cited
UNITED STATES PATENTS

| | | |
|---|---|---|
| 3,433,612 | 3/1969 | Dickinson et al. ............... 65/99 A |
| 3,445,214 | 5/1969 | Ormesher ..................... 65/182 R X |
| 3,489,543 | 1/1970 | Kita et al. ......................... 65/182 R |
| 3,795,500 | 3/1974 | Murphy ....................... 65/182 R X |

*Primary Examiner*—Arthur D. Kellogg
*Attorney, Agent, or Firm*—E. Kears Pollock; Chester A. Johnston, Jr.; Russell A. Eberly

[57] ABSTRACT

Flat glass having a thickness less than equilibrium float glass thickness is continuously produced by a float process in which molten glass is discharged onto molten metal between marginal restraining members and is cooled and attenuated to a dimensionally stable ribbon of glass without substantial change in the width of the ribbon from the width of the molten glass flowing between the restraining members.

4 Claims, 4 Drawing Figures

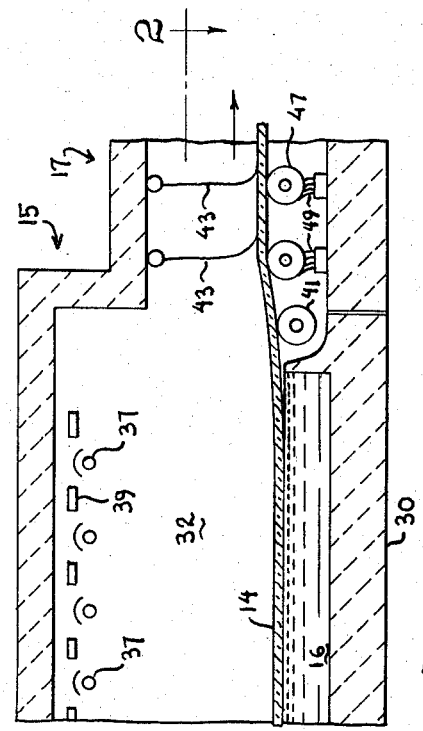
Fig.1
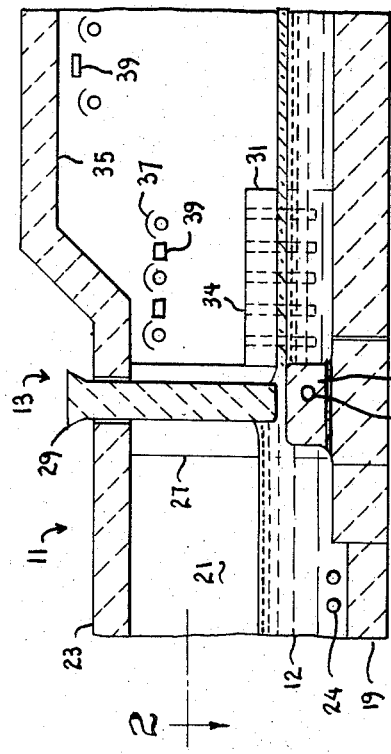
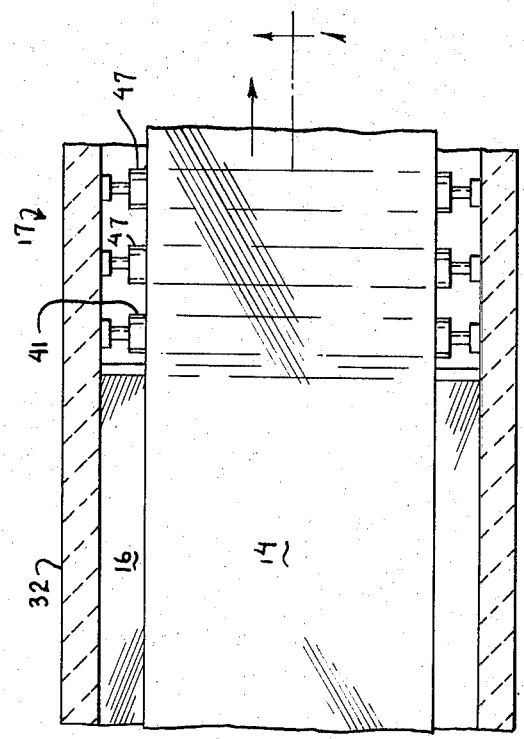
Fig.2
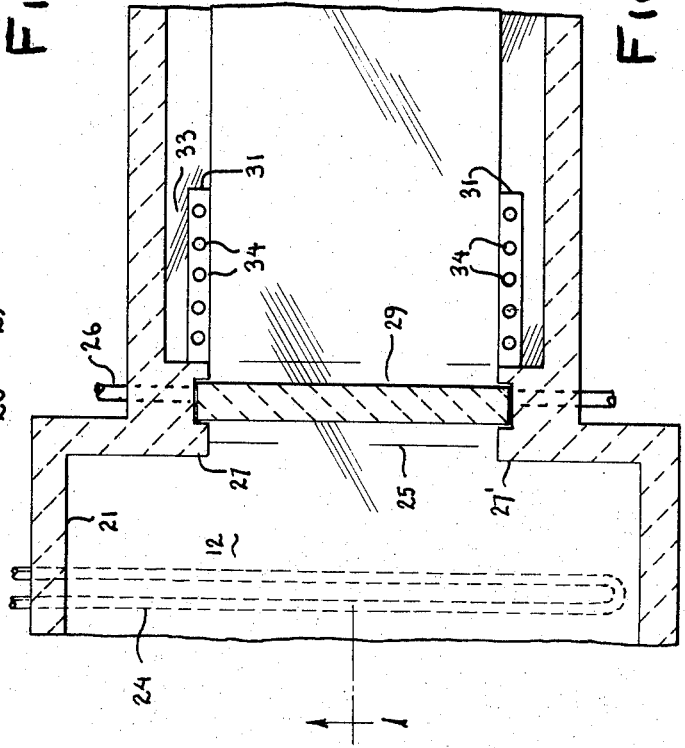

METHOD AND APPARATUS FOR THE MANUFACTURE OF THIN GLASS ON MOLTEN METAL

CROSS-REFERENCE TO RELATED APPLICATIONS

This application is related to the following commonly assigned applications, all of which were filed on Mar. 6, 1973 and all of which are specifically incorporated by reference herein: "Manufacture of Glass by Contiguous Float Process," Ser. No. 338,497, to Charles K. Edge and Gerald E. Kunkle; "Manufacture of Glass," Ser. No. 338, 475, to William F. Galey; and "Delivery of Glass to a Float Forming Process," Ser. No. 338,496, to William C. Harrell and Homer R. Foster.

BACKGROUND OF THE INVENTION

1. Field of the Invention

This invention relates to the manufacture of a continuous sheet of flat glass by floating molten glass on a pool of molten metal while attenuating and cooling the glass. More particularly this invention relates to methods and apparatus for manufacturing glass thinner than equilibrium thickness float glass by unidirectionally attenuating it during formation.

2. Description of the Prior Art

Continuous manufacture of flat glass by delivering molten glass onto a pool of molten metal and then attenuating it and cooling it to form a continuous sheet of glass is well known. Representative patents describing the making of flat glass by a float process are: U.S. Pat. Nos. 3,083,551 and 3,220,816. When floating molten glass on molten metal, such as tin, the glass layer floating on the tin naturally assumes an equilibrium thickness of about 0.25 inch. Techniques have been developed for making glass by a float method in a variety of thicknesses both greater than and less than this equilibrium thickness. Commonly known and practiced techniques for making thinner than equilibrium glass are those in which the glass is simultaneously attenuated both in width and in thickness in accordance with the teachings of U.S. Pat. No. 3,215,516 and those in which the ribbon is positively restrained and outward lateral stretching forces are applied as taught in the following patents: U.S. Pat. No. 3,352,657, U.S. Pat. No. 3,493, 359 and U.S. Pat. No. 3,709,673. In the making of thin glass by these known techniques the optical quality of the resulting glass is degraded relative to the optical quality of equilibrium thickness glass. Optical distortion occurring in glass made by the techniques described in the patents referred to is particularly pronounced in the marginal regions of the ribbon extending inwardly from the edges and covering from 5 to 25 percent of the glass ribbon.

SUMMARY OF THE INVENTION

Glass making materials are melted, and molten glass is refined within a glass melting and refining furnace. Molten glass is then delivered as a relatively thin stream having a width much, much greater than its thickness onto the surface of a pool of molten metal, preferably tin. In a preferred embodiment the glass is delivered across a threshold member through an opening as wide as the intended ultimate continuous sheet or ribbon of glass. The amount of glass delivered onto the molten metal may be controlled by a metering member, which in the preferred embodiment is a downwardly disposed, adjustably positioned gate or tweel. Once delivered onto the molten metal the glass flows between two substantially parallel guides or restraining members. In the preferred embodiment these members are spaced a distance from one another equal to the width of the molten glass delivery opening. These restraining members are made of material which is at least partially wet by molten glass at the temperature of the molten glass when first contacting it. The restraining members extend longitudinally in the direction of glass movement for a distance sufficient to provide for substantial cooling of the glass while flowing between them. At the extremes of the restraining members farthest from the glass furnace, the glass only slightly wets the restraining members, if at all. At the point where the glass emerges from between the restraining members and is no longer restrained by them, it does not wet the restraining members sufficiently to require any significant force to pull the glass away from the members. The restraining members may be differentially heated or cooled along their longitudinal lengths so as to control the degree to which glass wets the restraining members along its path of travel in contact with them.

While moving between the restraining members the thickness of the glass is attenuated to a thickness less than that which would be attained at equilibrium between the glass and the metal in the absence of positively imposed tractive forces. This attenuation is an attenuation of the thickness alone for net lateral movement of glass is prevented by the restraining members. Tractive attenuation forces are applied longitudinally to the glass by being transmitted through the colder glass moving farther downstream through the process toward an annealing lehr. Because of the continuity of the glass, forces applied to the glass ribbon well downstream in the process are transmitted upstream in a uniform and unidirectional fashion.

The degree to which molten glass wets the guide members as it passes between them may be determined by observing the interaction between glass of the same composition as being formed and the guide member material at various temperatures. This may be done is small scale experiments in which the force required to rotate a rod or plate of guide member material from the molten glass is measured. The force per unit contact area is determined and correlated with temperature. Then, using radiation pyrometers aimed at the molten glass-guide member interface, contact temperatures are determined in the apparatus employed to practice this invention. From the earlier correlation the glass-guide wetting gradient is easily determined. Also, in the practice of this invention, if the lehr speed is increased substantially without making any other changes, the width of the ribbon of glass downstream of the guides will decrease before the glass separates from the guides and becomes narrower between them.

In a preferred embodiment of this invention the guide members are differentially heated or cooled along their length in order to provide for a wetting gradient along the length of the guides. The guide members are made of graphite or a refractory material, such as an alumina-soda refractory. The guide material is wet by glass in direct proportion to its temperature and to the temperature of the glass in contact with it, Heat may be applied differentially to a guide by providing each guide with a series of wells which are partially filled with molten metal and into which are inserted a series of electrodes. By supplying current to these electrodes, resistance heating is obtained. Current flows from one electrode through the metal in the well, through the electrically resistant guide and through the glass supporting metal to the ground. Heat is generated in the guide due to its electrical resistivity.

Differential wetting of the guide members may also be accomplished by providing differential lubrication along the length of the guide members. Embodiments of the invention embracing this concept include the use of guide members, each having a trough extending along its length on top of the guide with the trough having a sloped weir facing the glass so that lubricant may flow down the wall of the guide member facing the glass with more lubricant flowing down along the downstream portion of the guide than flowing down along the upstream portion nearest the discharge means. The present invention will be further understood from the drawings and descriptions which follow.

The present invention is applicable to any glass which may be float formed, such as soda-lime-silica glasses, borosilicate glasses and the like.

BRIEF DESCRIPTION OF THE DRAWINGS

FIG. 1 is a longitudinal, sectional view of an apparatus for making thin glass in accordance with the present invention.

FIG. 2 is a horizontal, sectional view taken along line 2—2 of FIG. 1.

DESCRIPTION OF THE PREFERRED EMBODIMENTS

Figure 3:
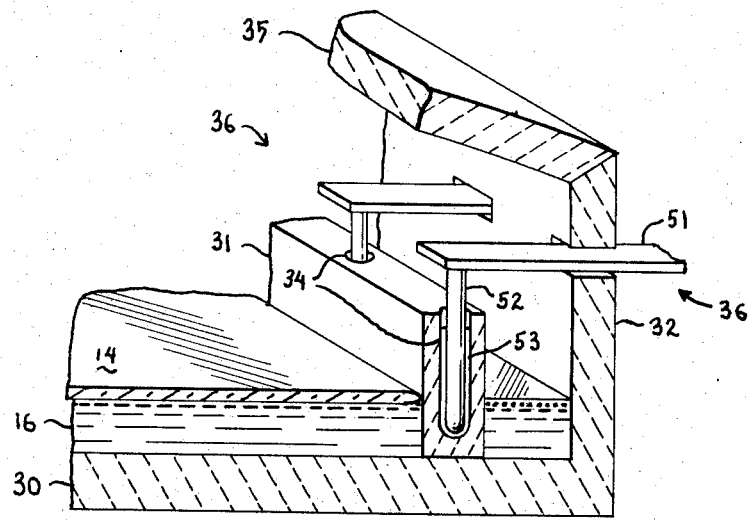
FIG. 3 is a perspective view showing details of the guide members of one embodiment and illustrating the means for differentially heating the guide member.

With particular reference to the drawings, and especially to FIGS. 1, 2 and 3, there is shown an apparatus for producing glass according to the preferred method of this invention. A glass furnace terminating in a refiner or conditioner 11 contains molten glass 12. The molten glass conditioner 11 is connected to a discharge means 13 through which molten glass 12 flows in a controlled manner to form a ribbon of glass 14 in a forming chamber 15. The forming chamber has within it a pool of molten metal 16 having a density greater than the density of the glass 12. Molten glass is delivered onto the molten metal and is drawn along the surface of the molten metal through the forming chamber 15. The glass is drawn along the surface of the molten metal through the forming chamber 15 to glass removal means 17 for lifting a finished continuous sheet of glass from the molten metal in the forming chamber. During the movement of the glass downstream through the forming chamber 15 the glass is cooled to change it from molten glass 12 to a dimensionally stable ribbon of glass 14 having its thickness defined by the extent to which it is attenuated while being cooled. The molten glass conditioner 11 comprises a refractory floor 19, side walls 21 and a roof 23. In the preferred embodiments of this invention the bottom floor 19 of the conditioner or refiner is stepped so that the depth of molten glass in the conditioner is less near its discharge end and at locations farther upstream within the conditioner. The glass conditioner is constructed and operated so that glass passing through it toward the discharge means is gradually cooled and allowed to lose gaseous and volatile impurities. The glass loses heat by conduction to the side walls and bottom as well as by radiation to the roof. The bottom of the conditioner is preferably cooled from below, as described in U.S. Pat. No. 3,776,710 to Leonard A. Knavish and James R. Schornhorst entitled "Manufacture of Glass," the description of which is incorporated herein by reference thereto. Additionally heat may be removed from the glass by the use of submerged cooling means 24 generally comprising a continuous pipe through which a coolant, such as water, may be passed. The use of such cooling means 24 is further described in pending application of Leonard A. Knavish entitled "Method of Making Glass," Ser. No. 300,952, filed Oct. 26, 1972 and commonly assigned, the description of which is incorporated herein by reference thereto.

The molten glass 12 is cooled to a temperature at which it is still easily flowable but to a temperature such that with some further cooling it may be formed into a dimensionally stable continuous sheet of glass. For typical soda-lime-silica glasses the temperature of the molten glass in the glass conditioner closest to the discharge means is from about 1,700°F. to 2,200°F.

The discharge means 13 comprises a support for the molten glass which in the preferred embodiment is a threshold block 25. The discharge means also comprises side jambs 27 and 27' which define the sides of the channel through which the molten glass may flow. The discharge means also comprises an adjustable metering means 29 extending downwardly into the molten glass. This metering means 29 is essentially a movable gate or tweel which may be adjusted upward or downward to control the size of the elongated horizontal opening formed by the threshold block 25, side jambs 27 and 27' and the tweel, itself.

The forming chamber 15 comprises a bottom 30 which supports and holds the molten metal 16. It also comprises guide members 31 positioned on opposite sides of the chamber and extending outwardly from the discharge means 13. The forming chamber 15 further comprises side walls 32 which serve to confine the atmosphere above the glass as well as providing for insulation against the excessive loss of heat outwardly to the sides. In the preferred embodiment, a space 33 is provided between the guide members 31 and the outside wall 32 so that the guide members are thermally isolated from the exterior walls. The guide members in the preferred embodiment are further provided with wells 34 for receiving heating means. The forming chamber 15 further comprises a roof 35 for confining the atmosphere above the molten metal and the glass during forming and for providing further insulation against heat loss.

Heaters are provided within the forming chamber 15. In a preferred embodiment guide heaters 36 (see FIG. 3) are provided. Roof heaters 37 are also provided, both in the region over the glass between the guides 31 and 31' and along the roof 35 extending downstream through the forming chamber 15. Local coolers are also provided in the forming chamber, in particular, roof coolers 39 are provided over the glass between the guides 31 and 31'.

At the downstream end of the forming chamber 15 is a glass removal means 17. Mounted at the end of the forming chamber is a take-out roll 41 disposed transversely across the path of glass movement. This roll supports the ribbon of glass 14 to lift it up from the molten metal bath 16. A series of barriers 43 engage the upper surface of the ribbon of glass 14 to isolate the atmosphere in the forming chamber 15 above the surface of the glass from the downstream processing equipment. The barriers 43 preferably comprise flexible asbestos sheeting mounted on the depending from a roof member 45 extending from the roof 35 of the bath chamber 15. The glass removal means 17 comprises, in addition to the take-out roll 41 and barriers 43, a series of rolls 47 which also support the glass. These rolls 47 also apply a longitudinal tractive force to the glass drawing it from the forming chamber 15 and carrying it to further processing equipment, such as an annealing lehr. Mounted to contact with the rolls 47 are a series of brushes 49 which further serve to isolate the forming chamber 15 from downstream processing equipment.

In practicing the method of this invention sufficient tractive force is applied to glass by the rolls 47, as well as by additional downstream rolls, to unidirectionally attenuate the glass to its desired final thickness. In the practice of the present invention the speed of rolls 47 is coordinated with the controlled differential wetting of the guides 31 and the rate of delivery of molten glass through the discharge means 13 so that high-quality glass having a thickness thinner than equilibrium glass may be produced without marking or distorting the marginal portions of the glass ribbons. Marking, which is common in conventional processes, is avoided. The use of lateral attenuation in addition to the desired longitudinal attenuation in conventional processes generally requires engaging the marginal portions of the ribbon with stretching devices that mark the glass.

Referring now to FIG. 3, further details of the controlled differential wetting feature of the guides employed in this invention will be appreciated. In the preferred embodiment a guide 31 is constructed of an alumina-soda refractory, such as Monofrax-M refractory material. This material is fused cast alumina, 96 %, with 4 % soda, $Na_2O$ to promote electrical conductivity and is manufactured by Carborundum, Inc. This material is wet by glass to an increasing extent in direct proportion to the temperature of the glass-refractory interface. Guide 31 is provided with a series of heater wells 34 and a series of heaters 36 so that a controlled temperature gradient between the glass and the refractory guide may be established along the longitudinal length of the guide extending along the direction of general glass movement.

The guide heaters 36 comprise bus bars 51 extending into the chamber from a source of electrical power (not shown). Connected to each bus bar 51 is an electrode rod 52 extending into a heater well 34. To provide for intimate electrical contact between the electrode rod 52 and the guide 31, the space surrounding the electrode rod 52 in the heater well 34 is filled with a highly conductive material 53, such as molten tin. The electrode rods 52 are preferably graphite rods. Each guide 31 is preferably provided with a series of temperature-sensing devices to control the temperature of the guide at various points along its length to fixed set points. The temperature-sensing devices are preferably thermocouples embedded within the guide member 31 and connected to conventional temperature controllers employed to a control the amount of electric current provided to heaters 36 so that the temperature of the guide member 31, at each point along its length, may be controlled, preferably by simple feedback control. The temperature of the marginal portions of the molten glass flowing between the guide 31 may be detected by a series of optical pyrometers located in the roof 35 of the chamber 15 and aimed at the marginal portions of the glass adjacent to the guides 31. The signals from such a series of pyrometers may also be employed in a control loop to control the temperature of the guide 31 along its length.

In addition to providing heat to the glass between the guide members by differentially heating each guide member itself, heat may be supplied to the glass, particularly to its marginal portions, by radiating heat from a series of marginal roof heaters 37 positioned over the glass in the region of the guide members. In a preferred embodiment roof heaters 37 over the guide members are so designed as to provide for greater heating over the marginal portion of the ribbon than over the center portion, and, in a particularly preferred embodiment, additional roof coolers 39 are provided over the central portion of the glass in the region between the guide members 31 so that as the marginal portions of the glass are heated. The central portion of the glass may be cooled while passing between the guide members.

In another embodiment of the present invention differential wetting of the guide member 31 is provided by differential lubrication rather than by differential heating as in the preferred embodiment. This embodiment of the present invention is illustrated in detail in FIG. 4. As may be seen in FIG. 4, guide member 31 is provided with a channel or through 61 along its top extending along the length of the guide member. This trough 61 is provided with a sloped weir 62 along the side of the guide facing the glass. The sloped weir extends downwardly from the upstream end of the guide to the downstream end of the guide. A lubricant, such as molten salt or preferably a molten metal, such as the tin, is continuously supplied to the trough 61 to form a pool of lubricant 63 in the trough. In a preferred embodiment the lubricant is molten tin which is supplied to the trough either by continuously pumping molten tin to the trough by pumping means not shown or by continuously feeding solid tin to the upstream end of the trough and providing localized heating to melt the tin in the trough. Because the weir 62 of the trough 61 is sloped downwardly, as viewed from the upstream to the downstream end of the trough, more lubricant flows over the weir and down the side of the guide member 31 at its downstream end than at its upstream end. Corresponding to this greater downstream lubrication there is less wetting of the guide by the glass at the downstream end of the guide than at the upstream end of the guide so that differential wetting is obtained. In order to provide for thermal control of the molten lubricant a heating element 64 is disposed within the trough 61 so that the lubricant may be heated just prior to flowing down into contact with glass. A suitable heating element is a graphite bar connected to an electrical power source not shown which may be heated by electrical resistance heating. The heating of the lubricant in this embodiment provides for a convenient method for supplying heat to the marginal portions of the glass ribbon while cooling the center of the ribbon to a relatively greater extent. This results in improved optical quality of the finished ribbon of glass.

The practice of the present invention may be more fully appreciated with reference to the examples which follow. The dimensions of the forming chamber used in these examples are as follows:

The length of the chamber from the downstream edge of the threshold block 25 to the end of the pool of molten tin is 53 inches. The width of the chamber between the side walls 32 is 7 inches and the width between the guides 31 and 31' is 3 inches. The guides, made of Monofrax-M, alumina-soda refractory, extend along the length of the chamber for a distance of 4 inches. Thermocouples are located in the molten tin on opposite sides of the ribbon downstream of the guides and at the exit of downstream end of the chamber. Roof heaters (¾ inch diameter globars) are located above the glass at locations extending downstream from the end of the threshold block 25. Eighteen heaters are positioned along the roof on 2-inch centers. Thermocouples are provided embedded within the threshold block 25 which is comprised of fused silica. Optical pyrometers are mounted to view the glass passing over the threshold immediately before discharge onto the molten tin. The guides are provided with electrical heating means and are provided with ammeters and voltmeters for recording the amount of power supplied to the heating means.

EXAMPLE I

The described apparatus is operated to produce glass of equilibrium thickness. The conditions of the process are summarized in Table I which also summarizes the thickness of the glass ribbon produced and the width of the glass ribbon produced in one-hour increments over a period of 8 hours of operation. The operation is quite stable, and it may be observed that in making equilibrium thickness glass the heat maintenance effect of the guide members which are thermally isolated from the outside walls is sufficient to provide for the making of equilibrium thickness glass without substantial variation in the width of the ribbon after it is no longer confined between the guide members. Throughout all of the discussion of this disclosure it will be apparent that a variation in width of less than ±5% is considered to be equivalent to the same width in that there is substantially no width change.

EXAMPLE II

This example describes the making of thin glass according to the preferred embodiment of this invention. The conditions of the process over a 7-hour period are summarized in Table II in 1-hour increments. In this example the guides are insulated sufficiently from the outside walls to maintain a suitably high temperature along the edges of the glass to control the release of the glass from the guides. The central portion of the glass is cooled relative to that in Example I and the roof heaters are operated at lower power. The result is the production of thinner than equilibrium glass having the full width of discharge glass flow between the guides.

TABLE I

| TIME | 1 | 2 | 3 | 4 | 5 | 6 | 7 | 8 |
|---|---|---|---|---|---|---|---|---|
| Melter | | | | | | | | |
|   Crown F | 2620 | 2660 | 2700 | 2700 | 2680 | 2670 | 2650 | 2660 |
|   Level, inch | 3⅝ | 3¾ | 3⅝ | 3¾ | 3¾ | 3½ | 3⅝ | 3¾ |
| Refiner °F | | | | | | | | |
|   Crown (1) | 2300 | 2310 | 2320 | 2320 | 2360 | 2370 | 2360 | 2370 |
|   Bottom (2) | 1975 | 1980 | 2000 | 2010 | 2020 | 2230 | 2020 | 2040 |
| Threshold | | | | | | | | |
|   Block (3) | 1760 | 1760 | 1770 | 1190 | 1790 | 1800 | 1800 | 1810 |
| Bath °F | | | | | | | | |
|   Rad No. 1 | 1650 | 1630 | 1650 | 1680 | 1640 | 1640 | 1650 | 1650 |
|   No. 2 | 1440 | 1420 | 1420 | 1460 | 1430 | 1420 | 1430 | 1430 |
|   No. 3 | 1220 | 1170 | 1200 | 1210 | 1180 | 1180 | 1190 | 1180 |
|   Tin T.C. No. 1 | 1370 | 1370 | 1390 | 1420 | 1400 | 1380 | 1390 | 1390 |
|   No. 2 | 1130 | 1130 | 1150 | 1180 | 1180 | 1145 | 1150 | 1150 |
|   No. 3 | 1310 | 1310 | 1330 | 1350 | 1330 | 1310 | 1320 | 1330 |
|   No. 4 | 1110 | 1105 | 1120 | 1150 | 1140 | 1130 | 1130 | 1130 |
|   No. 8 | 1620 | 1625 | 1630 | 1650 | 1630 | 1630 | 1630 | 1620 |
| Atmosphere | | | | | | | | |
|   $N_2$ Flow, CFH | 500 | 500 | 500 | 500 | 500 | 500 | 500 | 500 |
|   % $H_2$ | 3.9 | 3.9 | 3.9 | 3.9 | 3.9 | 3.9 | 3.9 | 3.9 |
| Globars Amps | | | | | | | | |
|   Set No. 14 | 52 | 52 | 52 | 52 | 50 | 50 | 52 | 52 |
|   No. 13 | 37 | 40 | 40 | 40 | 40 | 40 | 40 | 40 |
|   No. 12 | 5 | 10 | 10 | 10 | 10 | 10 | 10 | 10 |
|   No. 11 | off | — | — | — | — | — | — | — |
|   No. 10 | off | — | — | — | — | — | — | — |
|   No. 9 | off | — | — | — | — | — | — | — |
| Glass | | | | | | | | |
|   Lehr Speed, in/min | 5.8 | 5.3 | 5.8 | 7 | 7 | 6.2 | 6.2 | 6 |
|   Ribbon Width, inch | 2¾ | 2 9/16 | 3 | 3⅛ | 2⅝ | 2⅝ | 2¾ | 2¾ |
|   Center Thick., inch | .278 | .270 | .276 | .274 | .260 | .271 | .281 | .267 |

TABLE II

| TIME | 1 | 2 | 3 | 4 | 5 | 6 | 7 |
|---|---|---|---|---|---|---|---|
| Melter | | | | | | | |
|   Crown °F | 2600 | 2570 | 2580 | 2580 | 2560 | 2590 | 2580 |
|   Level, inch | 2¼ | 2½ | 2¼ | 2½ | 2¼ | 2⅛ | 2¼ |
| Refiner °F | | | | | | | |
|   Crown (1) | 2140 | 2140 | 2140 | 2130 | 2125 | 2315 | 2360 |
|   Bottom (2) | 1960 | 1950 | 1950 | 1940 | 1940 | 1940 | 1960 |
| Threshold | | | | | | | |
|   Block (3) | 1800 | 1790 | 1800 | 1800 | 1790 | 1790 | 1810 |

TABLE II — Continued

| TIME | 1 | 2 | 3 | 4 | 5 | 6 | 7 |
|---|---|---|---|---|---|---|---|
| Bath °F | | | | | | | |
| Rad. No. 1 | 1590 | 1600 | 1590 | 1590 | 1600 | 1610 | 1620 |
| No. 2 | 1410 | 1400 | 1400 | 1390 | 1410 | 1420 | 1440 |
| No. 3 | 840 | 840 | 840 | 830 | 840 | 850 | 860 |
| Tin T.C. No. 1 | 1450 | 1450 | 1450 | 1450 | 1460 | 1450 | 1470 |
| No. 2 | 1090 | 1090 | 1090 | 1090 | 1090 | 1100 | 1110 |
| No. 3 | 1310 | 1310 | 1300 | 1310 | 1300 | 1310 | 1320 |
| No. 4 | 1040 | 1040 | 1040 | 1040 | 1040 | 1020 | 1050 |
| Atmosphere | | | | | | | |
| $N_2$ Flow, CFH | 500 | 500 | 500 | 500 | 500 | 500 | 500 |
| % $H_2$ | 3.8 | 3.9 | 3.9 | 3.9 | 3.8 | 3.8 | 3.9 |
| Globars Amps | | | | | | | |
| Set No. 14 | 45 | 45 | 45 | 45 | 45 | 45 | 45 |
| No. 13 | 40 | 40 | 40 | 40 | 40 | 40 | 40 |
| No. 12 | 30 | 30 | 30 | 30 | 30 | 30 | 30 |
| No. 11 | 20 | 20 | 20 | 20 | 20 | 20 | 20 |
| No. 10 | 10 | 10 | 10 | 10 | 10 | 10 | 10 |
| No. 9 | — | — | — | — | — | — | — |
| Glass | | | | | | | |
| Lehr Speed, in/min | 3.2 | 3.2 | 3.2 | 3.2 | 3.2 | 3.6 | 3.6 |
| Ribbon Width, inch | 2⅞ | 2⅞ | 2⅝ | 2⅞ | 3⅜ | 3⅛ | 3⅝ |
| Center Thick., inch | .181 | .183 | .175 | .184 | .198 | .174 | .183 |

EXAMPLE III

This example is similar to that of Example II. With proper temperature control of the glass and coordinated glass throughput, a ribbon of constant width and constant, sub-equilibrium thickness is produced over a period of 8 hours.

TABLE III

| TIME | 1 | 2 | 3 | 4 | 5 | 6 | 7 | 8 |
|---|---|---|---|---|---|---|---|---|
| Melter | | | | | | | | |
| Crown °F | 2700 | 2700 | 2700 | 2700 | 2700 | 2700 | 2700 | 2700 |
| Level, inch | 3 7/16 | 3 7/16 | 3 7/16 | 3 7/16 | 3⅝ | 3⅝ | 3¾ | 3¾ |
| Refiner °F | | | | | | | | |
| Crown (1) | 2290 | 2290 | 2285 | 2285 | 2285 | 2285 | 2285 | 2285 |
| Bottom (2) | 1930 | 1930 | 1930 | 1930 | 1930 | 1940 | 1940 | 1950 |
| Threshold | | | | | | | | |
| Block (3) | 1830 | 1830 | 1830 | 1830 | 1830 | 1830 | 1803 | 1830 |
| Bath 20°F | | | | | | | | |
| Rad No. 1 | 1800 | 1800 | 1800 | 1800 | 1795 | 1800 | 1805 | |
| No. 2 | 1460 | 1480 | 1460 | 1470 | 1480 | 1470 | 1490 | |
| No. 3 | 1310 | 1320 | 1320 | 1320 | 1320 | 1320 | 1300 | 1300 |
| Tin T.C. No. 1 | 1580 | 1580 | 1580 | 1580 | 1580 | 1580 | 1580 | 1580 |
| No. 2 | 1260 | 1265 | 1265 | 1270 | 1270 | 1280 | 1280 | 1280 |
| No. 3 | 1350 | 1350 | 1350 | 1350 | 1350 | 1350 | 1350 | 1350 |
| No. 4 | 1210 | 1210 | 1210 | 1210 | 1210 | 1210 | 1210 | 1210 |
| No. 8 | 1890 | 1885 | 1885 | 1880 | 1880 | 1880 | 1880 | 1880 |
| Atmosphere | | | | | | | | |
| $N_2$ Flow, CFH | 600 | 600 | 600 | 600 | 600 | 600 | 600 | 600 |
| % $H_2$ | 3.1 | 3.1 | 3.0 | 3.0 | 3.1 | 3.0 | 3.1 | |
| Globars Amps | | | | | | | | |
| Set No. 14 | 56 | 56 | 55 | 55 | 56 | 56 | 56 | 56 |
| No. 13 | 47 | 47 | 46 | 46 | 46 | 47 | 47 | 47 |
| No. 12 | — | — | — | — | — | — | — | — |
| No. 11 | — | — | — | — | — | — | — | — |
| No. 10 | — | — | — | — | — | — | — | — |
| No. 9 | — | — | — | — | — | — | — | — |
| Glass | | | | | | | | |
| Lehr Speed, in/min | 4.7 | 4.7 | 4.7 | 4.7 | 4.7 | 4.7 | 4.7 | 4.7 |
| Ribbon Width, inch | 3 | 3 | 3 | 3 | 3 | 3⅛ | 3 | 3 |
| Center Thick, inch | .207 | .206 | .205 | .204 | .204 | .205 | .204 | .204 |

EXAMPLE IV

Figure 4:
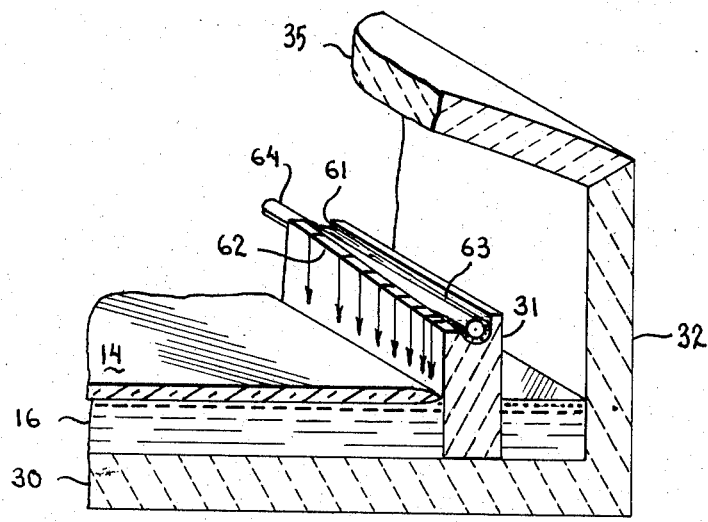
FIG. 4 is a perspective view of a guide member of another embodiment of the invention showing means for differentially lubricating a guide member.

Using an apparatus as in Examples I – III, except having guides as shown in FIG. 4, a ribbon of glass is produced at constant width and a thickness of 0.200 inch. During production molten tin is continuously caused to flow over the guides, and the glass temperature in the vicinity of the guides is maintained at about 1,800°F.

In the examples described above, the glass being formed has the following typical soda-lime-silica composition in percents by weight: 73% $SiO_2$, 13.6% $Na_2O$, 0.05% $K_2O$, 8.9% CaO, 3.9% MgO, 0.1% $Al_2O_3$, 0.3% $SO_3$ and 0.1% $Fe_2O_3$. The practice is applicable to other glass compositions as well. One particularly preferred class of glass compositions for use in this invention is that described in the copending application of Stanley M. Ohlberg and James V. Jones entitled "Method of Manufacturing Sheet and Float Glass at High Production Rates," Ser. No. 275,127, filed on July 26, 1972, and commonly assigned. The disclosure of this copending application is incorporated by reference herein. It describes glasses within the following compositional ranges in percents by weight: 70% to 73.3% $SiO_2$, 15.5% to 19.0% $Na_2O$, 0% to 0.5% $K_2O$, 5.5% to 7.7% CaO, 3.5% to 4.9% MgO, 0.1% to 1.5% $Al_2O_3$, 0% to 0.5% $SO_3$ and 0.03% to 0.7% $Fe_2O_3$. These glasses have particularly desirable viscosity temperature relationships and desirably broad working ranges.

EXAMPLE V

This example relates to the simulation of a full-scale float glass forming chamber using a 1/30 scale physical model sized and operated at equivalent Reynolds Numbers. The glass simulant is Aroclor 4465 sold by Monsanto Co., and the molten metal or tin similant is zinc chloride. The equilibrium thickness of the glass simulant on the molten metal simulant is about 0.325 ± 0.01 inch.

The forming chamber of the model is 35 ½ inches long and 11 ¾ inches wide. The discharge region is like that shown in FIGS. 1 and 2. The width of the discharge opening is 5 ¼ inches. The guides, made of polycarbonate, each extend 3 inches downstream from the opening. They are parallel and 5 ¼ inches apart. Each guide is provided with three electrical resistance heaters and two thermocouples. The width of the conditioner upstream of the discharge is 11 ¾ inches.

Glass simulant at an average temperature of about 174°F., which is equivalent to 2,370°F. in glass itself. Hereafter, glass simulant temperatures, guide temperatures and molten metal simulant temperatures are given in full-scale equivalents (Temperature, full scale equals about 40 times temperature, Model minus 4,600 in °F.)

The following table shows the results obtained in operating the model in accordance with this invention to produce thin glass in the absence of positive lateral restraint. Throughout this test period the ribbon width remained 4 ⅞ inch ± 1/16 inch.

| Guide Temperature Left and Right | | Lehr Speed | | Thickness of Sheet | |
|---|---|---|---|---|---|
| °F. | | inches/minute | | inch | |
| Model | Full Size | Model | Full Size | Model | Glass |
| 182 | 2690 | 3 | 90 | 0.327 | 0.270 |
| 175 | 2400 | 6⅝ | 198 | 0.112 | 0.125 |
| 173 | 2320 | 10⅝ | 318 | 0.089 | 0.075 |
| 171 | 2240 | 12½ | 375 | 0.058 | 0.065 |

From the above description it will be evident to those skilled in the art of glass making that any guides which are partially wet by glass are effective to hold a ribbon of glass while it is attenuated to a thickness less than eqilibrium. It will further be evident that the stretching of glass to a thickness less than equilibrium thickness from between spaced guides and in the absence of positively acting lateral stretching devices is evidence of the partial wetting of guides which characterizes this invention. The present disclosure of specific techniques for providing partially wet guides should not be construed as limiting the scope of this invention for these techniques are merely those presently contemplated as the best modes for carrying out the invention.

We claim:

1. In the method of manufacturing glass comprising the steps of delivering a stream of molten glass onto a pool of molten metal, conveying the glass along the surface of the pool of molten metal cooling the glass to form a dimensionally stable, continuous sheet of glass and withdrawing the continuous sheet of glass from the pool of molten metal, the improvement comprising:

a. flowing the molten glass onto the pool of molten metal between a spaced pair of restraining members comprising material that is at least partially wettable by molten glass;

b. providing a lubricant between the marginal edges of the glass and the restraining members with more lubricant being provided near the downstream ends of the restraining members, farthest from the location of glass delivery onto the pool of molten metal, than near their upstream ends, closest the location of glass delivery onto the pool of molten metal; and c. cooling the glass between the pair of restraining members while applying a sufficient longitudinal force to it to convey it in the direction of glass withdrawal from the pool of molten metal.

2. The method according to claim 1 wherein the lubricant provided is molten metal like that comprising the pool of molten metal.

3. In the apparatus for manufacturing glass comprising a glass melting and conditioning furnace, a forming chamber connected to the furnace by a molten glass delivery means, the forming chamber including a pool of molten metal for receiving and supporting glass for forming and means for cooling glass to form a dimensionally stable, continuous sheet of glass and means for withdrawing a continuous sheet of glass from the pool of molten metal and from the forming chamber and for applying longitudinal forces to the glass to convey it along the pool of molten metal, the improvement comprising:

a. a spaced pair of restraining members comprising material that is at least partially wettable by molten glass, each having a glass contacting surface extending from an upstream end near a location for receiving molten glass onto the pool of molten metal to a downstream end, one disposed on each side of the forming chamber with the pair defining a space between them for conveying glass on the pool of molten metal during cooling;

b. means for differentially lubricating each restraining member along its length comprising means for flowing molten metal over at least a portion of each said glass contacting surface and between it and the molten glass, said means being adapted to flow a greater amount of molten metal adjacent the downstream portion of the restraining member than adjacent the upstream portion of the restraining member; and c. means for cooling the glass between the restraining members.

4. The apparatus according to claim 3 wherein the means for differentially lubricating the restraining member along its length comprises a trough for molten metal extending along the length of the restraining member and having a sloped weir which permits greater flow of molten metal over the side of the restraining member at its downstream end than at its upstream end.

* * * * *